United States Patent [19]
LeFol et al.

[11] Patent Number: 5,042,785
[45] Date of Patent: Aug. 27, 1991

[54] ELASTICALLY YIELDABLE ARTICULATION WITH A HYDRAULIC STIFFENING

[75] Inventors: Marcel LeFol, Chateaugiron; Pascal Robic, Guignen, both of France

[73] Assignees: Automobiles Peugeot, Paris; Automobiles Citroen, Neuilly/Seine, both of France.

[21] Appl. No.: 320,512

[22] Filed: Mar. 8, 1989

[30] Foreign Application Priority Data

Mar. 8, 1988 [FR] France ................ 88 02954

[51] Int. Cl.⁵ ................ F16M 5/00; F16M 13/00
[52] U.S. Cl. ................ 267/140.1; 248/562; 267/219
[58] Field of Search ........ 267/140.1, 276, 281, 267/219, 220, 140.2, 141.2, 293, 140.1 R, 140.1 C; 248/562, 636; 180/300, 312, 295; 280/716, 717

[56] References Cited

U.S. PATENT DOCUMENTS

| | | | |
|---|---|---|---|
| 3,642,268 | 2/1972 | Hipsher | 267/281 |
| 3,698,703 | 10/1972 | Hipsher . | |
| 4,416,445 | 11/1983 | Coad | 267/140.1 |
| 4,424,960 | 1/1984 | Dan et al. | 267/140.1 |
| 4,756,514 | 7/1988 | Kanda | 267/140.1 |
| 4,834,416 | 5/1989 | Shimoe et al. | 267/141.2 |
| 4,871,152 | 10/1989 | Funahashi | 267/140.1 C |
| 4,877,262 | 10/1989 | Tanahashi et al. | 267/140.1 C |

FOREIGN PATENT DOCUMENTS

| | | | |
|---|---|---|---|
| 0054776 | 6/1982 | European Pat. Off. . | |
| 0220465 | 5/1987 | European Pat. Off. . | |
| 0278798 | 8/1988 | European Pat. Off. . | |
| 3722079 | 1/1988 | Fed. Rep. of Germany | 248/562 |
| 2555688 | 5/1985 | France . | |
| 0063141 | 5/1981 | Japan | 267/141.2 |
| 58-88245 | 5/1983 | Japan . | |
| 59-93533 | 5/1984 | Japan . | |
| 0168931 | 9/1985 | Japan | 267/140.1 |
| 60-231039 | 11/1985 | Japan . | |
| 61-286633 | 12/1986 | Japan . | |
| 0046036 | 2/1987 | Japan | 267/140.1 C |
| 0184249 | 8/1987 | Japan | 248/562 |
| 2192968 | 1/1988 | United Kingdom | 267/140.1 |

Primary Examiner—Robert J. Oberleitner
Attorney, Agent, or Firm—Burns, Doane, Swecker & Mathis

[57] ABSTRACT

The elastically yieldable articulation is of the type comprising a cylindrical outer armature and a coaxial inner armature interconnected by a block of elastomer material and movable with respect to each other. According to the invention, the articulation comprises at least one deformable sealed chamber filled with a liquid and arranged between two portions of each of the two armatures so as to increase the elastic stiffness of the articulation in a direction (T) of relative displacement of the armatures substantially perpendicular to an axial plane (P) of the articulation and at least in a direction corresponding to an approach between these portions. Application in particular in the mounting of a set of wheels of a vehicle.

14 Claims, 2 Drawing Sheets

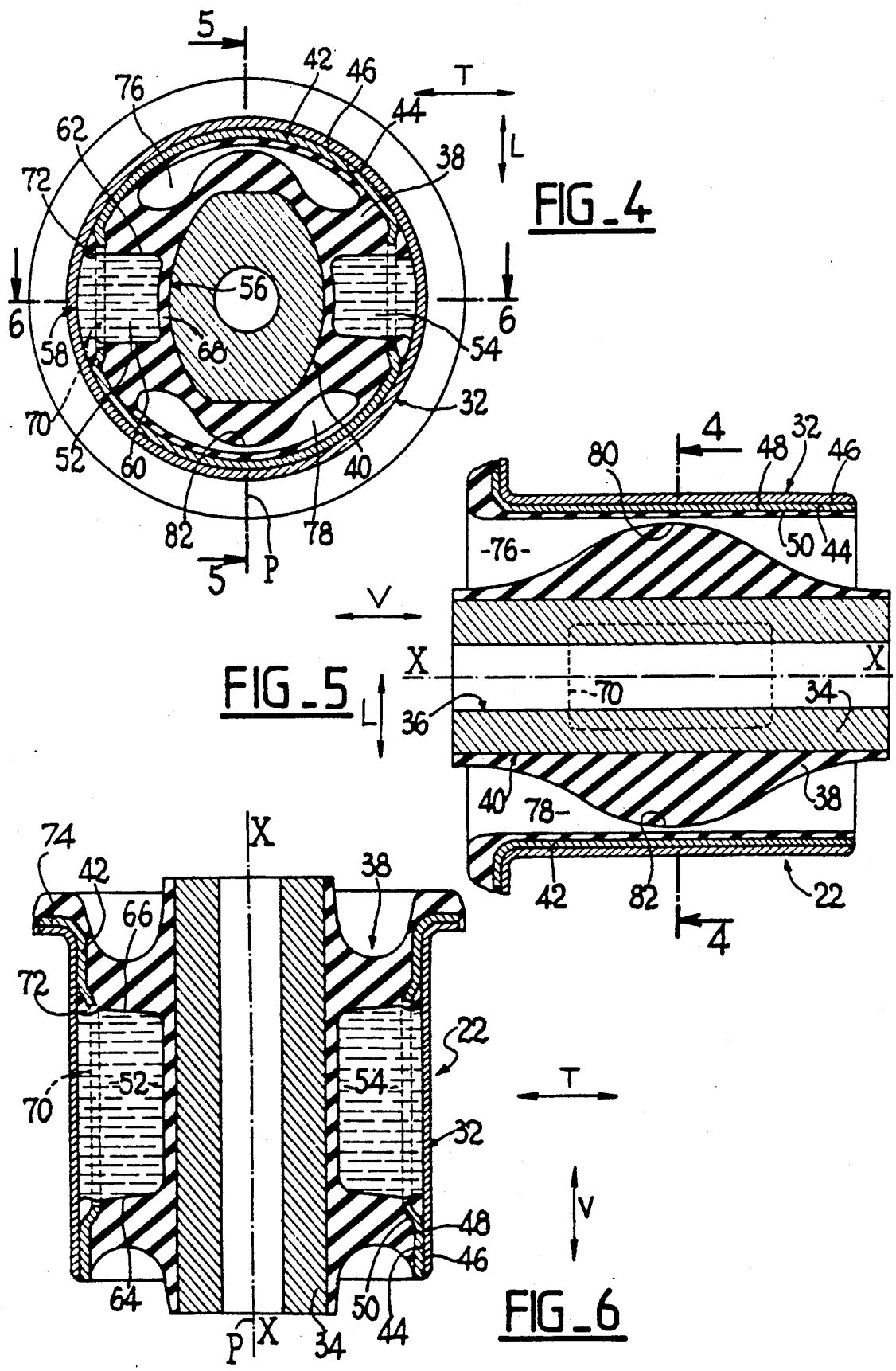

ELASTICALLY YIELDABLE ARTICULATION WITH A HYDRAULIC STIFFENING

The present invention relates to an elastically yieldable articulation of the type comprising a cylindrical outer armature and a coaxial cylindrical inner armature interconnected by a block of elastomer material and movable with respect to each other.

Such a type of elastically yieldable articulation is in particular employed for mounting a set of wheels, such as the rear axle, of a motor vehicle relative to the body of the latter.

In this latter type of mounting, it is conventional to employ two elasticlay yieldable articulations located symmetrically on each side of the longitudinal axis of the motor vehicle. The elastically yieldable articulation must not have the same elastic stiffness in all directions. In order to obtain a good filtering of vibrations transmitted by the set of wheels to the body of the vehicle, the articulation must have the lowest possible stiffness in the longitudinal direction. The stiffness in the vertical direction must be compatible with the load of the body of the vehicle that the articulation supports.

On the other hand, the highest possible stiffness is necessary in the transverse direction in order to provide the transverse guiding of the set of wheels relative to the body of the vehicle.

An object of the present invention is to provide an elastically yieldable articulation having a ratio of the transverse stiffness to the vertical stiffness which is very high and in particular higher than 20.

According to the invention, this is achieved by means of an elastically yieldable articulation which comprises at least one deformable sealed chamber filled with a liquid and arranged between two portions of each of the two armatures in such manner as to increase the elastic stiffness of the articulation in a direction of relative displacement of the armatures substantially perpendicular to an axial plane of the articulation and at least in the direction corresponding to an approaching movement of said portions.

Owing to this feature, an elastically yieldable articulation arranged on the body of the vehicle in such manner that said direction of relative displacement is the transverse direction of the vehicle, enables the elastic stiffness of the articulation in said direction to be very greatly increased owing to the incompressibility of the liquid contained in the sealed chamber which opposes the approach of the two armature portions.

According to other features of the invention:

the chamber is formed by a cavity provided in the block of elastomer material defined radially by the two confronting surfaces of the armature portions and laterally by the elastomer material;

the cavity is also defined radially by an end wall which is in one piece with the block and bonded or vulcanized to the confronting surface of one of the armature portions;

the cavity is a substantially parallel-sided cavity whose lateral walls define a rectangular contour and extend in planes perpendicular to said axial plane;

the block of elastomer material is secured by bonding or vulcanization to the inner cylindrical armature;

the articulation comprises a reinforcing cylindrical armature whose outer surface is complementary to the inner surface of the outer cylindrical armature and on the inner surface of which is bonded or vulcanized the block of elastomer material, and the reinforcing armature comprises an aperture laterally surrounding said cavity;

the block of elastomer material provided with its reinforcing armature is mounted in the radially compressed state in the outer cylindrical armature, and the sealing of the cavity is achieved by an inner peripheral bead which is in one piece with the lateral walls of the cavity in the vicinity of the portion of the outer armature and which is mounted clamped between the outer armature and the peripheral edge portion of the aperture of the reinforcing armature;

the block of elastomer material extends axially substantially throughout the length of the articulation and the cavity is formed in the middle of said length;

the block of elastomer material comprises two peripheral axial recesses which open out and are symmetrically arranged on each side of the axis of the articulation in such manner as to permit a relative displacement of the two armatures in said axial plane;

the articulation comprises a second deformable sealed chamber filled with a liquid which is arranged between two other portions of each of the two armatures which are symmetrical with said two armature portions relative to said axial plane so as to increase the elastic stiffness of the articulation in said direction of relative displacement and in both directions of displacement.

Further features and advantages of the invention will be apparent from the following detailed description with reference to the accompanying drawings, in which:

FIG. 4 is a sectional view taken on line 4—4 of FIG. 5 of an elastically yieldable articulation arranged in accordance with the teaching of the invention;

FIG. 5 is a sectional view on line 5—5 of FIG. 4, and

FIG. 6 is a sectional view taken on line 6—6 of FIG. 4.

Figure 1:
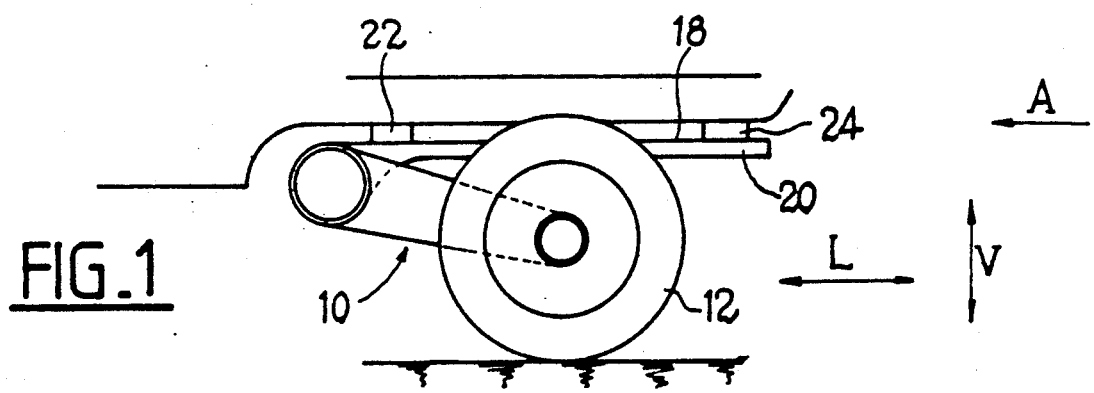
FIG. 1 is a diagrammatic side elevational view illustrating the general principle of the mounting of a rear set of wheels relative to the body of a motor vehicle.
Figure 2:
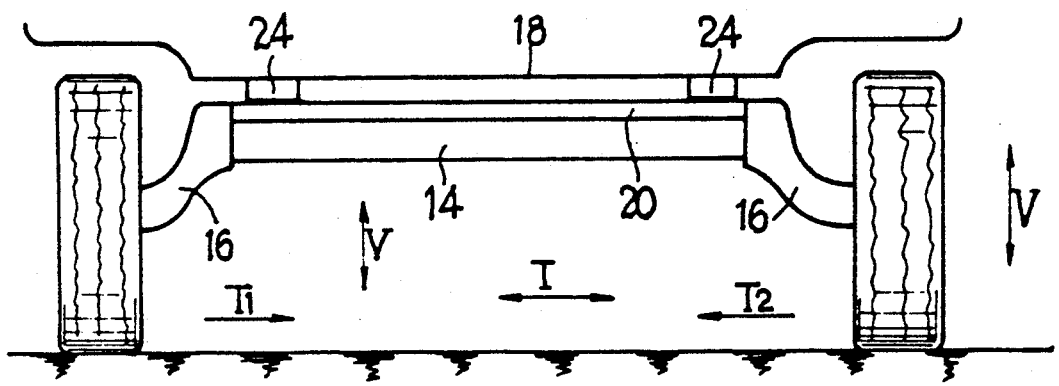
FIG. 2 is a view in the direction of arrow A of FIG. 1.

FIGS. 1 and 2 show a rear set of wheels of a motor vehicle comprising in particular wheels 12 connected to a central girder 14 by lateral arms 16. The girder 14 is connected to the body 18 by a cross-member 20 for a rear set of wheels with interposition of two elastically yieldable articulations 22 and two elastically yieldable connections 24.

Each elastically yieldable articulation 22 is subjected to forces in three main directions, i.e. in the vertical direction V, the longitudinal direction T and the transverse direction T.

The forces applied in the transverse direction T correspond to a relative displacement of the set of wheels 10 relative to the body 18 of the vehicle in a direction substantially parallel to the direction T, this displacement being capable of occurring in two opposed directions T1 and T2.

Figure 3:
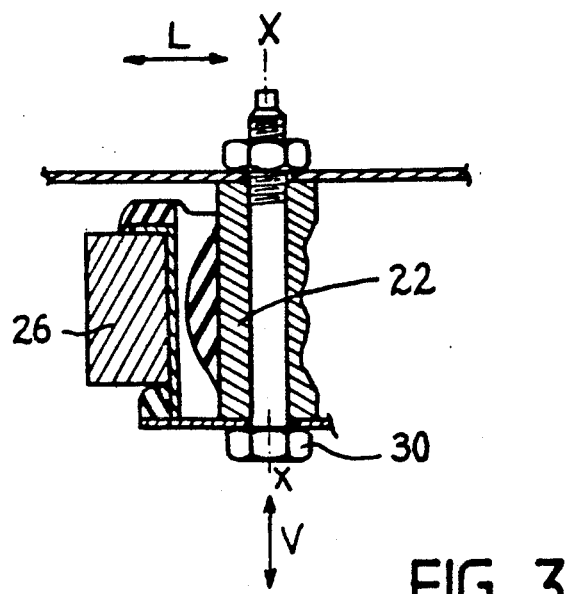
FIG. 3 is a view of the geometrical arrangement of an elastically yieldable articulation for the purpose of the mounting of the rear set of wheels shown in FIGS. 1 and 2.

The elastically yieldable articulation 22, as can be seen in FIG. 3, has a generally circular cylindrical shape and it is so arranged that its longitudinal axis X—X is perpendicular to the longitudinal direction L of the vehicle.

The elastically yieldable articulation 22 shown in FIGS. 4 to 6 comprises an outer circular cylindrical armature 32 made from sheet metal and an inner cylindrical armature 34 which has an oblong or cylindrical section and coaxial, relative to axis X—X, with the outer cylindrical armature 32.

The inner armature 34 which may be of metal or made from a plastics material, comprises an inner bore 36 permitting the mounting, for example on a crossmember 26 of FIG. 3, by means of an axial connecting rod 30.

The elastically yieldable articulation 22 further comprises a block 38 composed of an elastomer material which interconnects the two cylindrical armatures 32 and 34.

The block 38 of elastomer material extends substantially throughout the length of the articulation and is fixed by bonding or vulcanization to the outer surface 40 of the inner armature 34 which it surrounds throughout its surface.

The elastically yieldable articulation 22 comprises a reinforcing cylindrical armature 42.

The outer surface 44 of the reinforcing armature 42 is complementary to the inner surface 46 of the outer cylindrical armature 32. The inner surface 48 of the reinforcing armature 42 is fixed by bonding or vulcanization to the outer peripheral surface 50 of the block of elastomer material 38.

The block of elastomer material 38 provided with its reinforcing outer cylindrical armature 32 is mounted in the compressed state inside the outer cylindrical armature 32.

According to the invention, the block of elastomer material 38 is provided with two deformable sealed cavities 52 and 54 which are filled with a liquid, identical and symmetrically arranged relative to an axial plane P containing the axis X—X of the elastically yieldable articulation 22.

The two chambers 52 and 54 are identical and the chamber 52 will now be described in detail.

The chamber 52 is radially defined on the inside by a cylindrical portion 56 of the inner armature 34 and on the outside by a confronting cylindrical portion 58 of the outer cylindrical armature 32.

The chamber 52 is parallel-sided cavity formed in the block 38 and laterally defined by the block of elastomer material so that its two pairs of lateral walls 60-62 and 64-66 respectively define a rectangular cavity contour and extend in planes substantially perpendicular to an axial plane P.

The chamber 52 is sealed radially on the inside relative to the inner cylindrical armature 32 by a thin end wall 68 which is in one piece with the block of elastomer material 38 and bonded or vulcanized to the outer peripheral surface 40 of the armature portion 56.

The cavity 52 radially extends to the cylindrical portion of the outer armatur 58 owing to a corresponding aperture 70 of rectangular contour formed in the reinforcing armature 42.

The cavity 52 is sealed on the radially outer side by means of an inner peripheral bead 72 which is in one piece with the lateral walls 60-68 of the cavity in the vicinity of the portion 58 of the outer armature 32 and which is mounted clamped between the latter and the peripheral edge of the aperture 70.

When the elastically yieldable articulation 22 shown in FIGS. 4 to 6 is used for mounting a set of wheels of a motor vehicle, it must be disposed, as shown in the Figures, in such manner that the transverse direction T of the vehicle is perpendicular to the axial plane P of the articulation.

According to this arrangement, it will easily be understood that the elastic stiffness of the elastically yieldable articulation in the direction T is very highly increased owing to the incompressibility of the liquid contained in the chambers 52 and 54 which oppose the relative displacement of the inner armature 34 relative to the outer cylindrical armature 32 in a direction perpendicular to the axial plane P in a symmetrical manner in both directions of displacement T1 and T2.

On the other hand, when the inner armature 34 is stressed longitudinally, i.e. in direction parallel to the direction L, relative to the outer cylindrical armature 32, the chambers 52 and 54 have no amplifying effect on the elastic stiffness, their respective lateral walls then being under shear stress. In order to avoid that the block of elastomer material 38 and its reinforcing armature 42 do not move axially relative to the outer cylindrical armature 32, the latter comprises, at one of its ends, a radial edge portion 74 which is bent by a press operation.

According to the invention, the block of elastomer material 38 further comprises two throughway axial peripheral recesses 76, 78 arranged symmetrically on each side of the axis X—X of the articulation 22 so as to permit a relative displacement of the two armatures 32 and 34 in the axial plane P, i.e. in a direction parallel to the vertical direction V.

As can be seen in FIG. 5, each axial recess 76, 78 has a hollow inner profile, i.e. the block of elastomer material has two symmetrical convex spherical bosses 80 and 82 respectively which limit the movements of the inner cylindrical armature 34 in the axial plane P relative to the outer cylindrical armature 32.

The realisation of an elastically yieldable articulation 22 so as to ensure a perfect filling of the chambers 52 and 54 with an incompressible liquid such as water to which an anti-freeze is added, must be effected immersed in a bath of this liquid.

The mounting of the elastically yieldable articulation 22 in the housing 23 is effected in such manner that its outer cylindrical armature 32 is mounted clamped in the bore 30 so that its axial plane P always remains in a plane substantially parallel to the vertical direction V of the vehicle.

I claim:

1. An elastically yieldable articulation comprising:
   a cylindrical outer armature having an inner surface and a first portion,
   a coaxial inner armature having an outer surface and a second portion,
   a block of elastomer material interconnecting said two armatures, so that said armatures are movable with respect to each other,
   means for increasing static elastic stiffness of the articulation in a relative displacement direction including means defining at least one deformable sealed chamber filled with a liquid, having a substantially constant volume, being free of internal restrictions, arranged between said portions of said armatures, said direction of relative displacement of the armatures being substantially perpendicular to an axial plane of the articulation, passing through said sealed chamber, and at least in the direction corresponding to a movement of approach of said portions.

2. An elastically yieldable articulation according to claim 1, wherein said means defining said at least one chamber comprises a cavity in said block of elastomer material, which cavity is defined radially by confronting surfaces of said armature portions and laterally by said elastomer material.

3. An elastically yieldable articulation according to claim 2, wherein an end wall which is integral with said block and bonded to one of said confronting surfaces also radially defines said cavity.

4. An elastically yieldable articulation according to claim 2, wherein said cavity is a substantially parallel-sided cavity having lateral walls which define a rectangular contour and extend in planes perpendicular to said axial plane.

5. An elastically yieldable articulation according to claim 2, further comprising a reinforcing cylindrical armature having an outer surface complementary to said inner surface of said outer cylindrical armature and an inner surface, said block of elastomer material being bonded to said inner surface of said reinforcing armature, and said reinforcing armature defining an aperture laterally surrounding said cavity.

6. An elastically yieldable articulation according to claim 5, wherein said block of elastomer material provided with said reinforcing armature therefor is mounted in a radially compressed state in said outer cylindrical armature and said sealing of said chamber is achieved by an inner peripheral bead which is integral with lateral walls of said cavity in the vicinity of said portion of said outer armature and which is mounted clamped between said outer armature and a peripheral edge portion of said aperture defined by said reinforcing armature.

7. An elastically yieldable articulation according to claim 2, wherein the block of elastomer material extends axially throughout the length of the articulation and said cavity is provided in the middle of said length.

8. An elastically yieldable articulation according to claim 2, wherein an end wall which is integral with said block and vulcanized to one of said confronting surfaces also radially defines said cavity.

9. An elastically yieldable articulation according to claim 2, further comprising a reinforcing cylindrical armature having an outer surface complementary to said inner surface of said outer cylindrical armature and an inner surface, said block of elastomer material being vulcanized to said inner surface of said reinforcing armature, and said reinforcing armature defining an aperture laterally surrounding said cavity.

10. An elastically yieldable articulation according to claim 9, wherein said block of elastomer material provided with said reinforcing armature therefor is mounted in a radially compressed state in said outer cylindrical armature and said sealing of said chamber is achieved by an inner peripheral bead which is integral with lateral walls of said cavity in the vicinity of said portion of said outer armature and which is mounted clamped between said outer armature and a peripheral edge portion of said aperture defined by said reinforcing armature.

11. An elastically yieldable articulation according to claim 1, wherein said block of elastomer material is fixed by bonding to said inner cylindrical armature.

12. An elastically yieldable articulation according to claim 1, wherein said block of elastomer material comprises two axially extending throughway peripheral recesses symmetrically arranged on each side of an axis of the articulation so as to permit a relative displacement of said two armatures in said axial plane.

13. An elastically yieldable articulation according to claim 1, further comprising a second deformable sealed chamber filled with a liquid and arranged between two other portions of each of said two armatures which are symmetrical with the first mentioned two armature portions relative to said axial plane so as to increase the elastic stiffness of the articulation in said direction of relative displacement and in both directions.

14. An elastically yieldable articulation according to claim 1, wherein said block of elastomer material is fixed by vulcanization to said inner cylindrical armature.

* * * * *